March 30, 1937.  B. CHRISTMAS  2,075,007

RAZOR AND DEVICE EMBODYING RAZOR

Original Filed Feb. 23, 1933  4 Sheets-Sheet 1

INVENTOR-
Burton Christmas
BY Edward Thomas
his ATTORNEY-

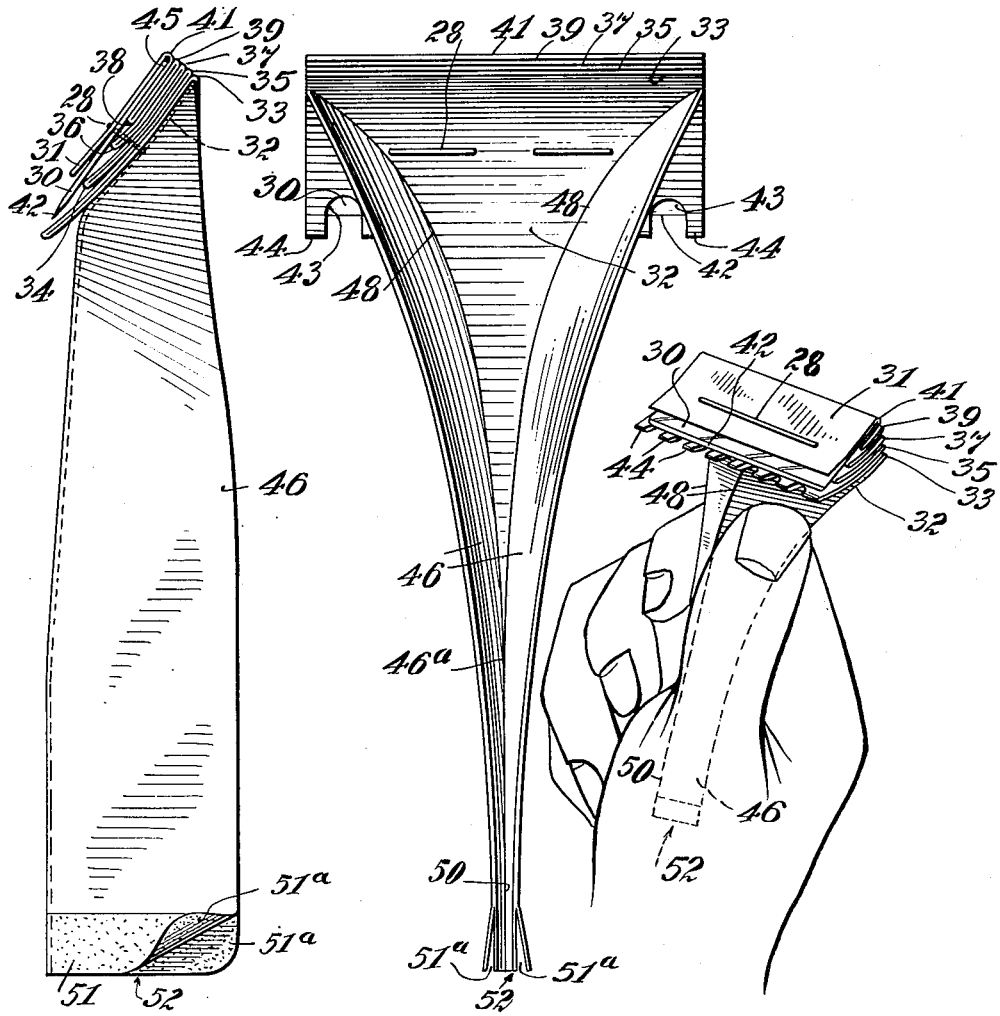

March 30, 1937. B. CHRISTMAS 2,075,007
RAZOR AND DEVICE EMBODYING RAZOR
Original Filed Feb. 23, 1933 4 Sheets—Sheet 3
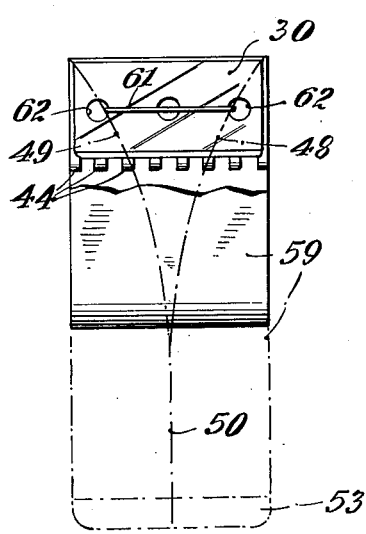
Fig. 9.
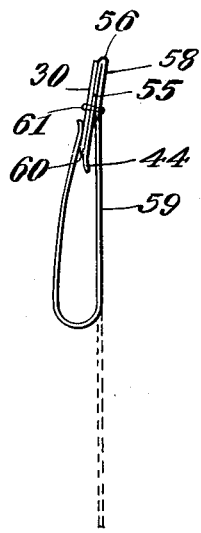
Fig. 10.
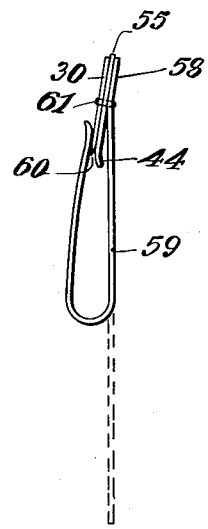
Fig. 11.
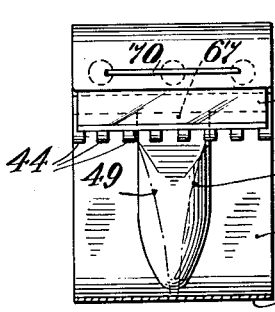
Fig. 12.
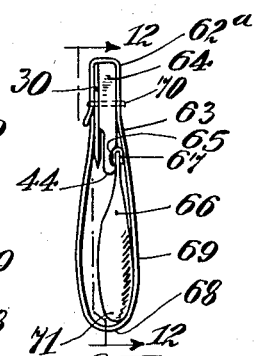
Fig. 13.
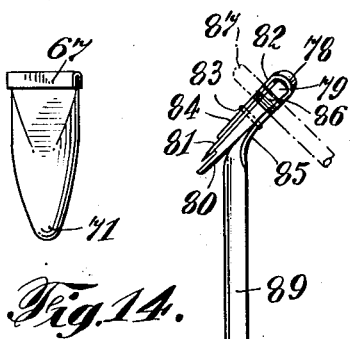
Fig. 14.
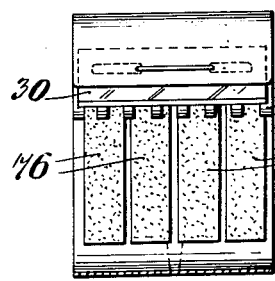
Fig. 15.
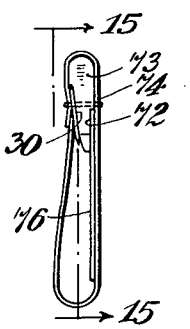
Fig. 16.
Fig. 17.
INVENTOR-
Burton Christmas
BY
Edward Thomas
his ATTORNEY- March 30, 1937.  B. CHRISTMAS  2,075,007
RAZOR AND DEVICE EMBODYING RAZOR
Original Filed Feb. 23, 1933  4 Sheets-Sheet 4

INVENTOR-
Burton Christmas
BY
Edward Thomas
his ATTORNEY-

Patented Mar. 30, 1937

2,075,007

UNITED STATES PATENT OFFICE 2,075,007

RAZOR AND DEVICE EMBODYING RAZOR

Burton Christmas, Youngstown, Ohio

Application February 23, 1933, Serial No. 657,988
Renewed January 21, 1937

13 Claims. (Cl. 30—47)

This invention relates to razors and devices embodying razors, and is herein illustrated as embodied in razors which are highly useful and yet can be manufactured so economically that they are well adapted to be given away as advertising devices. The razors illustrated are especially adapted for advertising purposes, since, in the form shown, they provide areas well adapted to receive printed advertising pictures, slogans or descriptive matter.

To this end, and other ends, the razors are herein shown as embodying a usual type of thin flexible or stiff blade which is supported in a card-board or fibre mounting. The mounting may include a flat protecting flap of sufficient area to receive a substantial amount of printed or other advertising matter.

The razor mounting is satisfactory when made of card-board or fiber board somewhat less stiff than five-ply Bristol board and somewhat more flexible than the cardboard commonly used in so-called paper boxes. It has been found possible to score or partly cut through the fiber board so that it folds into a form of a sort of box girder in the hand using the razor, yielding a handle which supports the blade substantially as stiffly as a metal handle.

The invention may take any one of several forms, some especially devised to enable the cheapest processes of manufacture to be employed others especially devised to prove a razor which shall be as useful as possible, and still others especially devised to accommodate, in the razor mounting, auxiliary or other articles of merchandise.

In one form of the razor a cardboard cover is adapted to be folded over adjacent the blade so that an abrasive carried on the cover is adapted to be used for sharpening the razor. In another form the razor mount is adapted to hold a tube which may be a tube of shaving soap or is adapted to hold another implement such as stiff sheet coated with sandpaper adapted to serve as nail files. Another razor may include both the sharpening device, the tube and certain nail files, if desired.

Some forms of the invention provide a razor which includes several of the advantages named above.

Other features and advantages will hereinafter appear.

In the accompanying drawings, Figure 1 shows one form of the razor which is shown as being sharpened by an abrasive surface forming part of the razor holder.

Figure 5 is a side view showing the razor of Figure 2 opened out and with its flap folded so as to serve as a stiff handle.

Figure 6 is a rear view of the device shown in Figure 5.

Figure 7 is a perspective view of the razor shown in Figure 6 on a smaller scale.

Figure 8 shows the razor blade being sharpened by the abrasive on the inside faces of the folded over flap.

Figure 9 shows an alternative form of razor.

Figure 10 is a side view of the razor shown in Figure 9.

Figure 11 shows a razor similar to that in Figure 10 except for a slight modification.

Figure 12 shows a form of razor especially adapted to hold a collapsible tube within its casing, and broken away to show the tube in place.

Figure 13 is a side view of the parts seen in Figure 12.

Figure 14 is a perspective view of the tube shown in Figures 12 and 13.

Figure 15 shows a razor slightly modified from the form of Figure 12 and broken away to show how it holds sandpaper strips in place.

Figure 16 is a side view of the device shown in Figure 15.

Figure 17 is a side view of an alternative form of razor especially designed for quick and accurate assembling by machinery.

Figure 1:
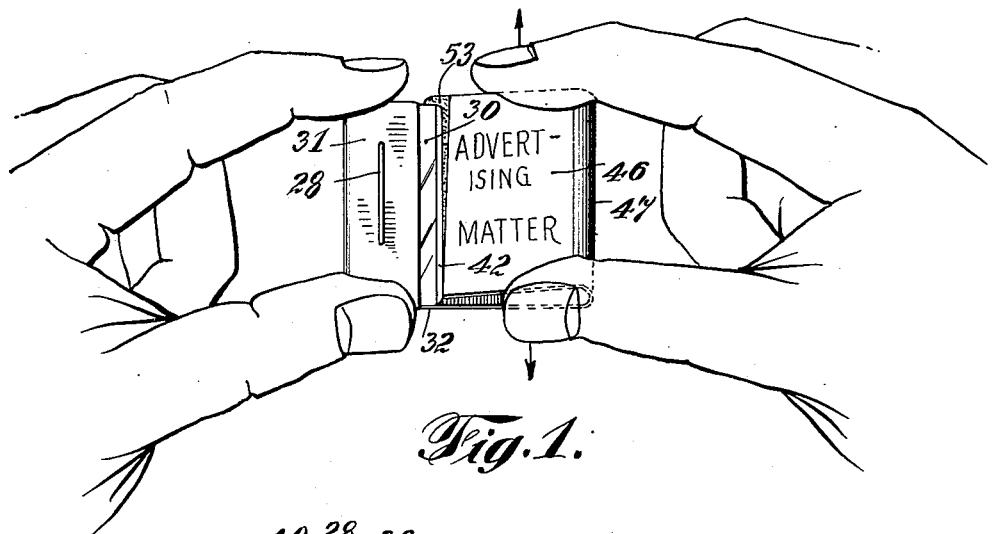
Figure 2:
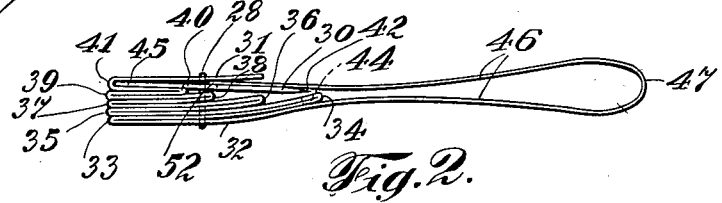
Figure 2 is an enlarged side view of the razor and its mounting showing the razor folded up.
Figure 4:
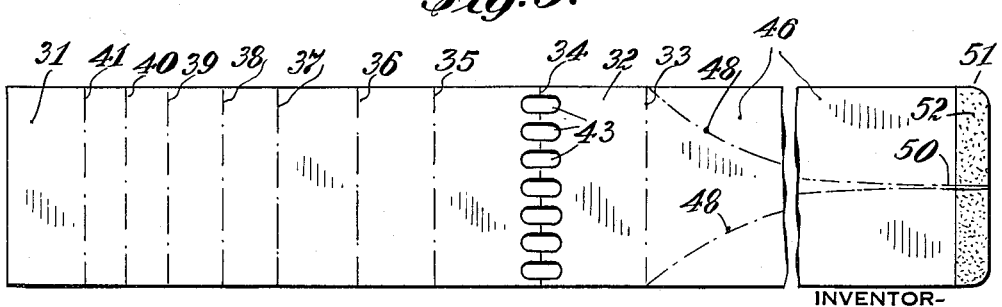
Figure 4 is a view of the perforated cardboard blank from which the razor shown in Figure 3 is adapted to be built by folding it as illustrated in Figure 2.

The razor shown in Figure 1 includes a blade 30 which is held between a front cardboard sheet 31 and a rear cardboard face 32 of the razor by a staple 28, passing through usual or other openings 29 in the razor blade. As best shown in Figures 2 and 4, the cardboard face 31, in the form shown, is part of a continuous strip of cardboard which includes the rear cardboard face 32 and intervening folds of cardboard made by folding it at 33, 34, 35, 36, 37, 38, 39, 40 and 41.

The fold in the cardboard at 33 is adapted to form part of a base for the razor, while the fold 34 is just above the edge 42 of the razor so as to form a guard and may be made by bending over along the line 34, the cardboard after it has been punched with holes 43 so that when bent over, the lugs 44 between the holes form a guard well suited for use in a safety razor.

The fold on the cardboard 35 forms part of the base substantially aligned with the fold 33 and then the cardboard extends upward toward the edge of the razor but is bent back at 36, short of the blade edge 42, thus giving space between the fold 36 and the edge for the guard to bend over and lie adjacent the edge 42 of the blade. The fold 37 of the razor is likewise aligned with the fold 33 and from it the cardboard extends upward toward the fold 36, but is folded back at 38 short of that fold, thus facilitating the holding of the razor 30 at the desired angle pointing down toward the guard lugs 44.

The cardboard is again bent back likewise at 39 to form another part of the base aligned with the fold 33 and is again folded back at 40 short of the fold 38 so as to further facilitate the holding of razor laid at the proper angle. The cardboard is then bent at 41 around the back end 45 of the blade, completing the base aligned with the fold 33, so that the cardboard front face 31 extends up partway to the razor edge 42.

The staple 28 is shown as passing through several of the stretches of cardboard between the folds 34, 35, 36 and 37, and if the holes in the blade suit, the staple may pass through all the layers.

The back face 32 of the cardboard is extended in a handle-forming cover 46, which usually extends clear of the razor blade nearly double the width of the blade, and then is bent back at 47 to form a cover adapted to lie with its end 52 between the front face 31 and the blade 30. In the form shown, the cardboard is a continuous sheet of cardboard adapted to be folded by machinery at 33, 34, 35, 36, 37, 38, 39, 40 and 41.

The cover extension 46 is shown as having grooves or scored folding lines 48 running from the corner toward the center where they meet a longitudinal center folding line 50, thus enabling the razor to be folded as shown in Figure 6 and held as shown in Figure 7 with the formation of a rigid handle through the folding of the extension 46. The stiffest handle, stiffly uniting the handle part 46 to the blade 30, has been obtained when the scored folding lines spring from the ends of the fold 41, pass just within the staple 33, and curve toward the end 52, uniting at 46a, beyond the fold 47, thus causing the handle 46 to fold into a stiff box-girder-like structure reaching, as clearly shown in Figure 7, well into the hand grasping the razor. This causes the blade 30 to project at a highly effective angle for shaving.

Figure 3:
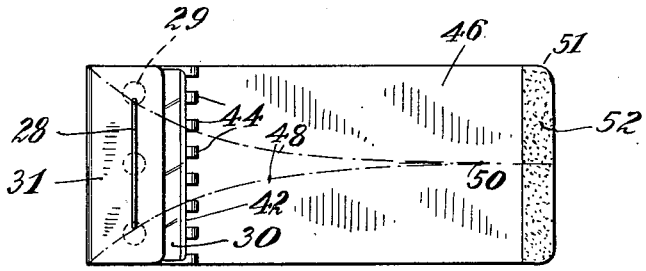
Figure 3 shows the razor on a smaller scale than Figure 2 with the flap unfolded out flat.

The extension 46 is also adapted to serve as a sharpening device and for this purpose is provided along its face 51 at the free end 52 with a coating of an abrasive as illustrated in Figure 3. The free end 51 may also be provided with a coating of abrasive on its outer surface 53 as shown in Figure 1.

This abrasive enables the razor to be sharpened by operation of the fingers. To effect sharpening, two fingers of one hand hold the razor as shown in Figure 1 and two fingers of the other hand hold the flap extension 46 and rub the flap extension with its abrasive face 53 over the razor, thus sharpening it. In a similar way the face 52 may be used in sharpening the razor.

As is clearly shown in Figures 5 and 6, the end 52 may be split and the internal faces 51a provided with abrasive, thus enabling both faces of the free end 52 to be used in simultaneously sharpening both faces of the razor, as illustrated in Figure 8.

As illustrated in Figure 8 one or both faces of the extension 46 or any other part of the exposed cardboard face may be covered with printing or with pictures, or serve as a writing surface, thus enabling the device to be used effectively as an advertising novelty.

The advertising matter is often advisedly applied to the face of the extension 46 so that, when the ends of the blade are held between the thumb and finger of the left hand and the user of the razor is sharpening it by manipulating the free end 51, the user reads the advertising matter face up. In other words, the advertising matter is printed with the initial letters of each line adjacent the abrasive face 53 as clearly appears in Figure 1.

The alternative form of razor shown in Figures 9 and 10 is especially adapted for manufacture where the cheapest possible razor is desired. In that form, the blade 30 is shown as lying on the front surface of a piece of cardboard 55 which is shown as having a bent edge 56 extending a little above the blade edge 57 to form a guard, and as bent back at 56 about on a line with the back end 45 of the razor blade 30, and then carried up so as to lie against the cardboard 55 at 58 and then extends as a springy cover 59 which is adapted to be bent over and lie against the blade 30 and protect its edge 60.

The blade 30 may be held to the cardboard 55 in any desired way in any form of razor. It has been found possible to glue it so that it may be used for several shaves, but ordinarily a staple 61 passing through openings 62 in the blade is more useful.

When using the razor, the cover 59 is bent along the central scored line 50 and is along the diagonal curved scored lines 48 and 49, so that it forms a stiff handle stiffly united to the blade 30.

The end of the cover 59 may be provided with an abrasive layer 53 and with printed matter on one or both surfaces, as is described above in connection with the structure shown in Figure 1.

In Figure 11 is shown a modified form of structure in which the cardboard 55 is a piece of cardboard separate from the cardboard 58, thus avoiding any sharp folding such as shown at 56 in Figure 10. The cover 59 is adapted to be used as a handle as described in connection with Figures 9 and 10.

The modified form of razor shown in Figures 12 and 13 is especially adapted to be dispensed or sold in connection with other articles. In the form shown, the razor includes a blade 30, a cardboard mounting 62a having an extension 63 which forms a foldable handle as described in connection with the other razors and provided with scored folding lines 48 and 49. In this form of razor, the guard 64 may be formed with a depression 65 at the back so that a tube 66, for example, may have its folded over end 67 caught in the depression 65 and the enlarged portion of the tube extend up toward the fold 68 in the handle 63 and be protected by the enlargement 69 formed by the springiness of the cardboard handle. The razor structure is held together by a staple 70. To obtain the maximum volume in the tube 66 it is shown as having a removable top 71 adapted to be pinched off or cut off rather than the usual screw top which occupies valuable room.

In Figures 15 and 16 is shown an analogous razor having, however, a different enlarged depression 72 between the guard 73 and the mounting 74 so that it is well adapted to hold slips of paper, which are herein shown in the form of very heavy paper having sanded surfaces 76 to serve as nail files.

Figure 18:
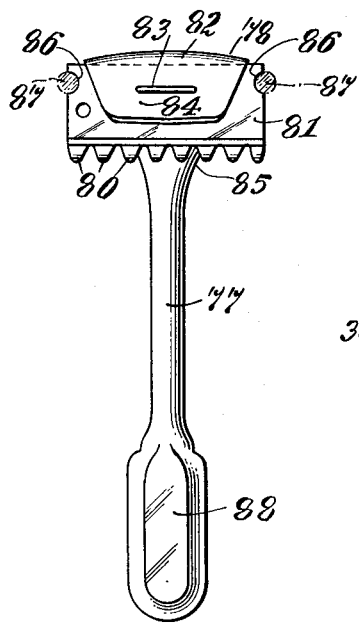
Figure 18 is a front view of the razor shown in Figure 17.

The razor shown in Figures 17 and 18 is a modified structure in which a non-folding stiff handle 77 is bent at 78 around the back 79 of a guard 80 and a blade 81. The handle in the form shown spreads out into a broad flat sheet 82 which encircles the back of the guard and blade as stated above and which is held in place by a staple 83 passing through the front flat surface 84 of the flat sheet 82 and the rear flat surface 85 of the flat sheet.

In order to accurately align the guard 80 and the blade 81, they may be each provided with cut-out semi-circular notches 86 at their opposite sides, said notches adapted to fit around aligning posts 87 or similar devices in a setting up jig or machine.

The handle 77 has been found satisfactory when made from the fiber handle of an ordinary waterproof fiber ice cream spoon. The handle of the spoon is provided at its narrow end with a relatively flat extension 88 and with a central stem 89, usually in the form of a channeled member having a channel several times the depth of the material out of which the handle is made and being rather broader than it is deep.

The handle thus obtained is exceedingly stiff with an almost metallic resiliency and the resulting razor is well adapted for certain purposes where it is not likely to be carelessly thrown around. In the form shown in Figures 17 and 18 the razor has no cover for the blade.

Figure 19:
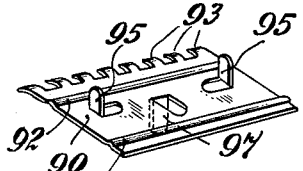
Figure 19 shows an alternative form of guard for a razor.

The razors described in connection with Figures 1 to 15 have been illustrated as including fiber or paper guards and spacing devices. If desired, the guard and spacing device may be in the form of a metal sheet such as is shown in Figure 19, having a central flat area 90 and one or more stiffening corrugations 92, there being provided a row of projections 93 near one of the corrugations, said projections being bent up as most clearly seen in Figure 20 to form the projections of the guard.

Figure 20:
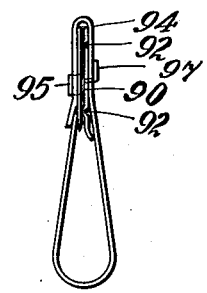
Figure 20 shows a razor embodying the guard of Figure 19.

When a metal guard is used, the guard itself may form eyelet or other stamped out tongues adapted to pierce the usual fiber mounting 94 of the type of razor shown in Figure 1. In the form illustrated, the guard is provided with two stamped-out tongues 95 projecting up from within the flat area 90 and turned down when the razor is assembled as shown in Figure 20 to form flat, binding tongues 95 which lie in front of the blade, and also to form a rear binding tongue 97 lying behind the guard and holding, when bent down, the rear side of the mounting 94 to the blade.

It is found that many users of safety razors use the razor with its cutting edge travelling in a straight path perpendicular to the line of the edge with the result that the cut into the hair is a cut of main force, without the advantage of a sliding cut. Skillful users of safety razors are aware that better results are obtained when the edge lies at a diagonal with a path of travel of the edge.

Figure 22:
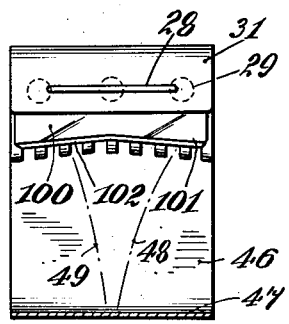
Figures 21, 22 and 23 show razors embodying alternative forms of razor blades adapted to cut more smoothly when carelessly handled.
Figure 21:
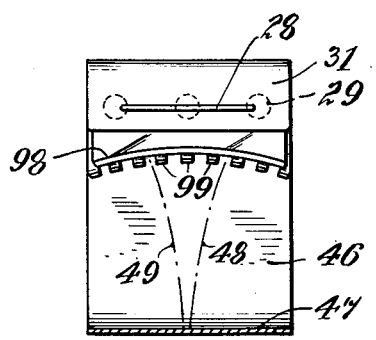

To provide a razor for those people who do not take care to cause the edge of the razor to lie in line diagonal to the path of the razor, the razor blade may be ground with a retreating center as shown at 98 in Figure 21, the edge 98 being along a smooth curve and adjacent a correspondingly smooth curve guard 99. Another form of razor providing an edge slanting to the path of travel of the razor is shown in Figure 22 where a blade 100 has a right hand portion 101 sloping in one direction, and a left hand portion 102 sloping in the other direction.

Figure 23:
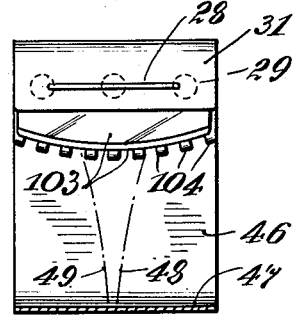

For shaving under the arms a razor having a form of curve differing from the curve shown in Figure 21 is preferable. Such a curve is shown in Figure 23 in which the outer cutting edge of the razor is shown as a convex line 103 associated with a convex guard 104, with the result that the corners of the razor are not likely to cut the skin and yet the razor will fit in a hollow in the body which is being shaved.

Figure 24:
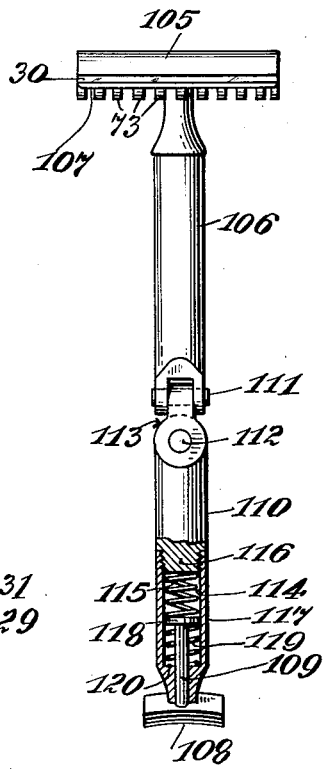
Figure 24 shows a metal razor embodying a sharpening device.

The metal razor, shown more or less conventionally in Figure 24, has a blade 30, a guard 73 and a plate 105 holding the blade to the handle 106. For sharpening the edge 107 of the blade 30, a thin metal piece or knife edge 108 is carried on a post or plunger 109 slidable in an extension 110 of the handle 106.

When it is desired to sharpen the edge 107 the blade 30, the extension 110 is swung down on the shaft hinge 111; the sharpening edge 108 is then placed against one side of the blade edge 107 and swung back and forth by swinging the extension 110 on the shaft hinge 112 in the hinge piece 113. To permit the sharpening edge 108 to follow accurately the blade edge 107, the plunger 109 slides in a cylindrical opening 114 in the extension 110, and is resiliently held centrally of the cylinder by a spring 115 bearing against the base 116 on which the cylinder wall 117 is screwed, so that it thrusts against a piston 118 on the plunger 109, said spring 115 thrusting the edge 108 down against the pressure of a spring 119. The spring 119 bears against the head 120 of the cylinder 114.

The wedge-shaped guard shown in Figures 15 and 16 holds the blade at a highly effective cutting angle.

Having thus described certain embodiments of the invention, what is claimed is:

1. In a razor, a blade, a fibrous mounting for the blade, an extension of the mounting forming a cover to be folded down over the blade, and means holding the cover to the blade, said cover centrally scored along part of its length to form a stiff handle, and also including a single scored line extending rearwardly from each end of the blade approaching the longitudinal center of the handle, but spaced from the center of the handle more than half the length of the handle so that the handle folded along the spaced scores folds into a girder-like handle.

2. In a razor, a blade, a flexible fiber mounting for the blade, and an extension of the mounting forming a bent-over cover, said extension including a single scored line extending rearwardly from each end of the blade and going diagonally toward the longitudinal center in a direction beyond the middle mid-length of the handle so that the handle folded along the scores folds into a girder-like handle.

3. In a razor, a blade, a flexible fibre mounting for the blade, lying partly in front of the blade, and a turned over extension of the mounting behind the blade forming a bent over cover, said cover scored along lines that are substantially spaced from each other along more than half the length of the handle, so that it forms a box-girder-like structure with a large part of the deepest webs at right-angles to the blade extending into the palm of the hand of a user of the razor to form a stiff mount and handle for the blade.

4. In a razor, a blade, a flexible fibre mounting for the blade, lying partly in front of the blade, and a turned over extension of the mounting behind the blade forming a bent over cover, said cover scored along lines that are substantially spaced from each other along more than half the length of the handle so that it forms a box-girder-like structure with a large part of the deepest webs at right-angles to the blade extending into the palm of the hand of a user of the razor to form a stiff mount and handle from which the blade projects and is stiffly held at an effective cutting angle.

5. In a razor, a blade, a flexible fibre mounting for the blade, lying partly in front of the blade, and a turned over extension of the mounting behind the blade forming a bent over cover, said cover scored along lines that are substantially spaced from each other along more than half the length of the handle so that it forms a box-girder-like structure with a large part of the deepest webs at right-angles to the blade extending into the palm of the hand of a user of the razor to form a stiff mount and handle from which the blade projects and is stiffly held at an effective cutting angle, and holding means passing through the front mounting, the blade, and the extension behind the blade, so as to hold the extension to the blade at the edge of the girder.

6. In a razor, a blade, a flexible fibre mounting for the blade, and an extension of the mounting to form a box-girder-like structure with a large part of the deepest webs at right angles to the blade to provide a stiff holder extending more than half the length of the handle, stiffly holding the blade at an effective cutting angle.

7. In a razor, a blade, a fibrous sheet mounting for the blade, an extension of the mounting sheet forming a cover to be folded down over the blade, so that the cover is adapted to swing lengthwise of the blade, and an abrasive surface on the cover adapted to sharpen the blade as the cover swings when moved by the user's fingers.

8. In a razor, a blade, a fibrous mounting for the blade including an outer section lying on the face of the razor, an extension of the outer section folded back of the razor to form part of the base and support a back area of the blade, a second longer extension folded so that the upper fold supports the blade nearer its edge, a third longer extension folded along a line of perforations so that the perforated fold forms a guard, and a fourth extension forming a handle and a cover for the blade.

9. In a razor, a blade, a fibrous mounting for the blade including an outer section lying on the face of the razor, an extension of the outer section folded back of the razor to form part of the base and support a back area of the blade, a second longer extension folded so that the upper fold supports the blade nearer its edge, a third longer extension folded so that the upper fold supports the blade still nearer its edge, a fourth longer extension folded along a line of perforations, to form a guard, and a fifth extension forming a handle and a cover for the blade.

10. In a razor, a blade, a fibrous mounting for the blade including an outer section lying on the face of the razor, an extension of the outer section folded back of the razor to form part of the base and support a back area of the blade, a second longer extension folded so that the upper fold supports the blade nearer its edge, a third longer extension folded so that the upper fold supports the blade still nearer its edge, a fourth longer extension folded along a line of perforations, to form a guard, a fifth extension forming a handle and a cover for the blade, and abrasive material carried adjacent the free end of the cover to enable the cover to be operated to sharpen the blade.

11. In a razor, a blade, a fibrous mounting for the blade including an outer section lying on the face of the razor, an extension of the outer section folded back of the razor to form part of the base and support a back area of the blade, a second longer extension folded so that the upper fold supports the blade nearer its edge, a third longer extension folded so that the upper fold supports the blade still nearer its edge, a fourth longer extension folded along a line of perforations, to form a guard, and a fifth extension forming a handle and a cover for the blade including a central folding line and side folding lines curving outwardly from the central line to the sides of the blade.

12. In a razor, a blade, a sheet fiber mounting for the blade, an extension of the mounting sheet adapted to fold over and cover the blade, an abrasive surface along the edge of the cover adapted to be rubbed against the blade to sharpen it, and printed matter on the outer face of the cover having its base at right angles to the abrasive surface edge.

13. In a razor, a blade, a fiber mounting for the blade including a face in front of the blade and coming up toward its edge but terminating short of the edge, an extension of the mounting behind the blade and reaching up a substantial distance above the blade so as to form a cover handle, a binding device passing through the front face and an opening in the blade and the extension to hold the blade in the mounting, said cover foldable to form a cover having its edge caught behind the face where it projects above the binding device, said cover including a single scored line extending rearwardly from each end of the blade and going diagonally toward the center in a direction beyond the longitudinal middle of the handle so that the handle folded along the scores folds into a girder-like handle.

BURTON CHRISTMAS.